(12) United States Patent
ten Brink

(10) Patent No.: US 8,375,438 B1
(45) Date of Patent: Feb. 12, 2013

(54) SYSTEM AND METHOD FOR PREVENTING UNAUTHORIZED ACCESS TO MODULES, ESPECIALLY IN AUTOMATION SYSTEMS

(75) Inventor: Carsten ten Brink, Bad Bentheim (DE)

(73) Assignee: Siemens Aktiengesellschaft, Munich (DE)

( * ) Notice: Subject to any disclaimer, the term of this patent is extended or adjusted under 35 U.S.C. 154(b) by 2663 days.

(21) Appl. No.: 10/275,719

(22) PCT Filed: Oct. 25, 2000

(86) PCT No.: PCT/DE00/03769

§ 371 (c)(1),
(2), (4) Date: Aug. 18, 2003

(87) PCT Pub. No.: WO01/31407

PCT Pub. Date: May 3, 2001

(51) Int. Cl.
*G06F 7/04* (2006.01)

(52) U.S. Cl. .................. 726/17; 726/4; 726/21; 705/56

(58) Field of Classification Search .................. None
See application file for complete search history.

(56) References Cited

U.S. PATENT DOCUMENTS

| | | | |
|---|---|---|---|
| 5,132,729 A * | 7/1992 | Matsushita et al. | 399/24 |
| 5,319,783 A | 6/1994 | Zink et al. | |
| 5,566,176 A | 10/1996 | Chang | |
| 5,608,395 A * | 3/1997 | Kurtz et al. | 341/50 |
| 6,173,896 B1 * | 1/2001 | Murl | 235/487 |
| 6,233,577 B1 * | 5/2001 | Ramasubramani et al. | 707/9 |
| 6,463,426 B1 * | 10/2002 | Lipson et al. | 1/1 |
| 6,591,252 B1 * | 7/2003 | Young | 705/67 |
| 7,162,035 B1 * | 1/2007 | Durst et al. | 380/54 |
| 2003/0002679 A1 * | 1/2003 | Akiyama et al. | 380/278 |

FOREIGN PATENT DOCUMENTS

| | | |
|---|---|---|
| EP | 612 004 A1 | 8/1994 |
| JP | 6-75862 | 3/1994 |
| JP | 8-190480 | 7/1996 |
| JP | 10-124131 | 5/1998 |

OTHER PUBLICATIONS

Japanese Office Action mailed Mar. 29, 2007 in corresponding Japanese Application No. 2001-533481.

* cited by examiner

*Primary Examiner* — Kaveh Abrishamkar
(74) *Attorney, Agent, or Firm* — Staas & Halsey LLP

(57) ABSTRACT

Unauthorized access to modules, especially modules in automation systems, is prevented by controlling access between modules and a central processing unit. At least one first device transmits an identifier to at least one of the central processing unit and a second device which evaluate(s) the identifier by comparison with at least one comparative identifier stored in the at least one of the central processing unit and the second device. Operation of the first device on the system is denied by the at least one of the central processing unit and the second device if the received identifier does not correspond to the comparative identifier.

13 Claims, 1 Drawing Sheet

SYSTEM AND METHOD FOR PREVENTING UNAUTHORIZED ACCESS TO MODULES, ESPECIALLY IN AUTOMATION SYSTEMS

CROSS REFERENCE TO RELATED APPLICATIONS

This application is based on and hereby claims priority to U.S. patent application Ser. No. 09/425,029 filed on Oct. 25, 1999, the contents of which are hereby incorporated by reference.

BACKGROUND OF THE INVENTION

The invention relates to a system and to a method for preventing unauthorized access to modules, especially in automation systems.

SUMMARY OF THE INVENTION

The invention is based on the object of controlling the access by modules in a simple and secure manner, especially in the field of automation technology.

This object is achieved by a system, especially an automation system, having a central processing unit and at least one first device which can be connected to the central processing unit and can transmit an identifier to at least one of the central processing unit and a second device which evaluate(s) the identifier transmitted by the first device, in such a manner that the identifier is compared with at least one reference identifier stored in the at least one of the central processing unit and the second device and if the received identifier does not match the reference identifier, the at least one of the central processing unit and the second device refuse the first device to be operated on the system.

Such a system and method provide for the possibility of denying unauthorized competitors, etc. the possibility of accessing the corresponding systems. The invention is based on the finding that only certain devices are permitted to be operated in automation systems, especially the automation systems/devices of the so-called SIMATIC series.

In automation systems it is usually the central processing unit which determines the configuration level, i.e. the number, type and functions of the devices connected. This is done in a data transmission, provided for this purpose, between the central processing unit and each device connected. If then the devices connected were to transmit an additional text in the sense of "I am an original Siemens module" to the central processing unit during a data transmission which is required in any case in such cases, the central processing unit could check the presence of this text in the data received in each case and refuse operation with devices which do not transmit this text.

Competitors who would copy the corresponding modules and their functions in order to connect themselves to the respective systems would commit an act detrimental to competition (section 1 of the German Law Against Unfair Competition (UWG)) if their modules were also to transmit the abovementioned text.—On the other hand, a competitor's module which does not transmit this text would not be accepted by the system.

Briefly, a method is provided in automation systems, of the type described above, which would have to be identically copied by a competitor in order to operate his modules in these systems but which he cannot copy without at least infringing the rules of the Law Against Unfair Competition.—An "inescapable trap" for the competitor.

Considering the Patent Law, the Law Against Unfair Competition basically opens up comparable possibilities of proceeding against a competitor. In particular, there is a 20 claim for a restrictive injunction, compensation for damages etc.— It should be easy to substantiate the additional unfairness required according to section 1 of the German Law Against Unfair Competition (UMG) by pointing out increased security requirements on automation systems: naturally, Siemens AG can only guarantee that these requirements are met in its own modules. Thus, the operation of third-party modules latently casts doubt on the functional reliability of the overall system. On the one hand, this justifies the introduction/checking of the identifier itself and forms a broad basis for the argumentation with regard to the additional matter of unfairness when proceeding against a competitor.

It would be possible to agree an unambiguous key (for instance "module allowed in . . . "), which could only be copied by other competitors in contravention of section 1 UWG, could be agreed with providers allowed to operate their respective modules in the respective systems by Siemens AG—for instance in the context of a partner concept. For example, the invention could also be used in the operation of storage modules in conjunction with automation devices since these storage modules, too, are increasingly copied in a largely identical manner.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
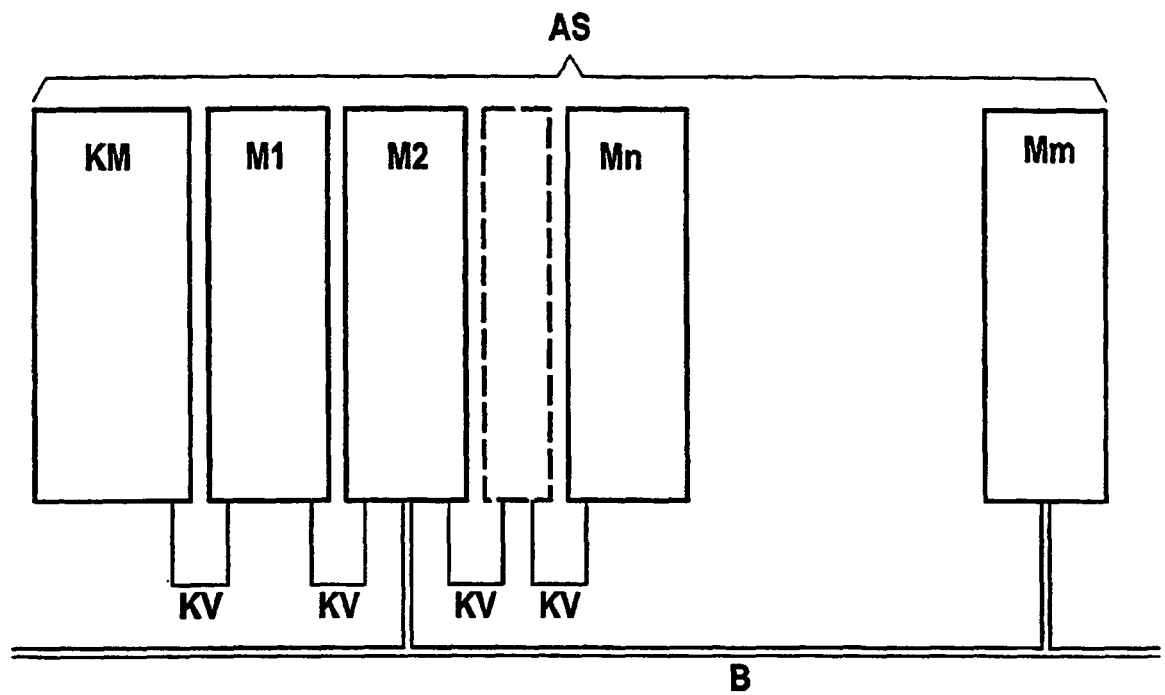
FIG. 1 is a block diagram of a device for controlling and/or monitoring an external technical process, not shown.

Reference will now be made in detail to the preferred embodiments of the present invention, examples of which are illustrated in the accompanying drawings, wherein like reference numerals refer to like elements throughout.

The device is an automation system AS having a central head module KM to which other modules M1, M2, Mn can be connected via communication links KV. The communication link KV can be a so-called back plane bus, that is to say, e.g. a correspondingly mounted or mountable circuit board with plug-in locations at which the individual devices KM, M1, M2, Mn can be plugged in. Furthermore, a connection between the individual devices KM, M1, M2, Mn by a corresponding cable connection, e.g. via ribbon cable, is conceivable as communication link KV. Theoretically, even wireless data transmission can be used as communication link KV by utilizing, e.g. inductive or capacitive coupling. The devices can also be communicatively connected to one another via a conventional bus system B as is indicated in FIG. 1 with the module M2 which has a connection for an external bus B, e.g. a field bus B, particularly the so-called PROFI bus, other modules Mn, which can be used for controlling and/or monitoring the external technical process, being connectable to this bus B. In particular, the module Mm can be a module which is arranged directly in the technical process, e.g. at a machine to be controlled and/or to be monitored.

The device KM, shown as head module KM in FIG. 1, is usually a so-called central processing unit of a stored-program control, i.e. the part of the stored-program control which contains at least the processor and usually also the memory. The processor of the head module KM runs a user program, during the processing of which states of the external technical process are read in continuously or cyclically or commands are issued to the external technical process. If it is then assumed, as an illustration, that the device Mm is connected to a motor of the technical process and this motor is monitored and controlled by the device Mm, information about the state of the motor as part of the overall technical process is initially available in the device Mm. The information passes via corresponding communicative links B, KV into the head module KM and is thus finally available for further processing in the user program. This situation is quite analogous if, e.g. the motor controlled by the device Mm is to be switched off. This information is initially the result of a logic operation of the user program which is running in the head module KM. The command for the motor reaches the device Mm controlling the motor via the communication links KV, B.

The exchange of such data from a first device, e.g. KM to a second device M1, M2, Mn, Mm, in this case, e.g. Mm, occurs by transmission protocols defined for the respective communication links KV, B. According to such a transmission protocol, a predefined message structure which is shown by way of example in FIG. 2 as far as it is required here for understanding the invention, is defined for transmitting particular data.

Figure 2:
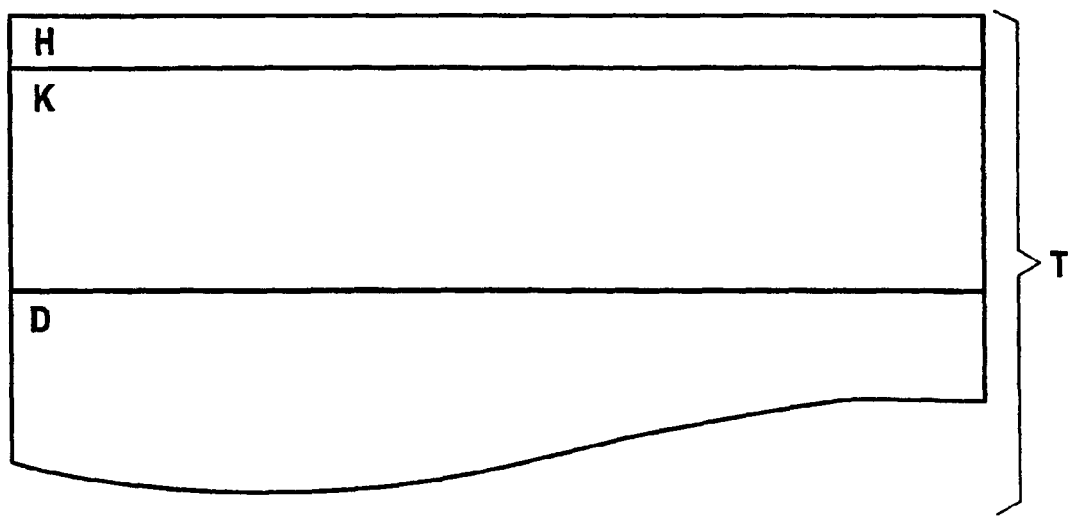
FIG. 2 is a predefined message structure for a transmission protocol.

According to FIG. 2, the message T includes a header H and finally the actual payload data D. In addition, the message can include other information K. The sequence of segments of the message as shown in FIG. 2 is not necessarily fixed and, in particular, e.g. the payload data D can follow directly after the header H.

The header H usually contains information about the transmitter and the receiver of a message T. To switch the motor connected to the device Mm off in accordance with the example already used above, the device KM would send a message T to the device Mm and thus the header H would correspondingly specify the device KM as transmitter of the message T and the device Mm as receiver of the message T. Furthermore, the header H usually contains information about the length of the message or information regarding any subsequent messages if the volume of the payload data D exceeds a predetermined maximum size of the message.

If, as is specified in some transmission protocols, the receiver of the message T is unambiguously specified in the message header, only the receiver specified in the message T responds to the message T and evaluates the payload data D.

For special applications, an additional securing interrogation is desirable which ensures that a message not only arrives at a particular receiver but additionally also guarantees that the message T is adequately dealt with by the respective receiver or that the receiver is capable of adequately dealing with the message T.

Assuming, e.g. an automation procedure for controlling a chemical process, it may be required for certain devices Mm to meet certain specifications. For example, it could be considered as a specification that the devices are so-called failsafe devices, that the devices are explosion-protected or that the devices meet the requirements of a particular protection class.

If a bus connection for connecting the bus system B is provided for the device Mm for connection to the control and/or monitoring system, a device which does not meet the requirements of these specifications could also be easily connected to the bus system B. If thus a device which does not meet the requirements of these specifications is wrongly selected for the device Mm and is connected to the bus system B, the overall automation system AS can certainly start operation but serious faults can occur in operation, e.g. in an environment at risk of explosion, if the device Mm is not explosion-protected.

In order that these types of constellations cannot occur and the engineer who connects the devices is not left with the erroneous assumption that the configuration provided by him is safe, it is provided in accordance with the invention that information about the specification of individual devices is transmitted in the messages, for example in message K.

In the example selected above, the identifier K could contain an information item of the type "protection class IP 65", "explosion protected", "failsafe" etc. as ASCII string. On receiving messages from the device Mm, the head module KM would in each case evaluate the identifier K of the message and stop further operation with the corresponding remote device Mm in the case where the identifier K does not contain information regarding the required specifications. If, e.g. the information "explosion protected" is missing in the identifier K, the information that the device Mm is not currently explosion protected would be present in the head module KM after the first communication of the head module KM with the device Mm at the latest, and a corresponding fault message could be generated by the user program running in the head module KM. The engineer who has erroneously connected a device Mm not corresponding to the required specifications is thus immediately informed about what measures to take for eliminating the current state.

It may also occur that a particular communication link is used for the first time at a comparatively late time in controlling and/or monitoring the technical process. In the case of a device Mm which is not explosion protected, always in the context of the present example, this may already lead to hazardous situations if a constellation at risk of explosion exists up to the time at which the communication link to the device Mm is used for the first time, in that, for example, a reactor is filled with an explosive gas mixture. However, since in distributed automation systems AS, as shown diagrammatically in FIG. 1, it is usually a prerequisite that the configuration level of the automation system is determined on switch-on or with the initial start-up of the automation system, and the central processing unit, the head module KM, addresses each connected device M1, M2, Mn, Mm in the course of the determination of the configuration level and receives from the respective device at least information about its functions, e.g. input module, output module, digital input module with 32 inputs, analog output module with 8 outputs and a resolution of 16 bits in each case, etc., the identifier K described above can be transmitted and checked already at this time, that is to say during the determination of the configuration level. If the identifier K is already transmitted and checked at this time and operation with a device which does not transmit the expected identifier K is refused, this ensures that an automation system which does not exhibit the required constellations and specifications in all of its components does not even start operation.

A basically similar constellation exists if devices of different performance classes can be connected to a communication link KV. Since bus connections are usually standardized contact points, it is technically easily possible to connect to a bus B, e.g. at the place of a digital input module for which the manufacturer guarantees a particular minimum period between the occurrence of two faults (Mean Time Between Failure—MTBF) due to special measures taken during the production process, a device which does not meet the requirements of these specifications but may be more inexpensive to obtain on the market. As an alternative or in addition to the information already described, the identifier K of the message can also contain information on such characteristics of the device, e.g. "MTBF=103 h".

Another area where the present invention can be used is providing a provider of automation systems AS of the type showed diagrammatically in FIG. 1 with the possibility of ensuring that in the automation system, only those devices are used which meet the specifications which correspond to the boundary conditions predetermined in accordance with the technical process to be automated in each case.

If, e.g. it is basically possible to connect devices of a third-party manufacturer to the automation system AS due to their hardware or software interface, a device of a third-party manufacturer can cast doubt on the permanent operability of the overall automation system AS due to other performance features, another type of construction of the respective technical device etc. and thus may also produce hazardous situations if, e.g. a plant or a part of a plant is not switched off in time.

A third-party manufacturer whose business obliges him to offer his devices as supplementary or replacement devices for connection to the automation system of another manufacturer will design his respective device, in the case where corresponding identifiers K are transmitted and checked as described above, in such a manner that the device transmits the identifier in accordance with the respective requirements and thus an operation of the device of the third-party manufacturer in the automation system AS is again made possible.

This would again nullify the gain in safety actually intended with respect to the permanent operability of the automation to be able to exclude exactly those devices which do not meet the requirements of particular specifications.

For this reason, it is provided according to the invention that the identifier contains at least one section which cannot be copied by a competitor without contravening corresponding protective laws—e.g. the Law Against Unfair Competition UWG in Germany.

The SIMATIC automation system, known throughout the world, is available from Siemens AG of Munich, Germany in different performance classes. To ensure that only either SIMATIC components or those components, the permanent and interference-free use of which in SIMATIC automation systems is verified in a corresponding certification process to a SIMATIC automation system, the identifier K could have, e.g. the following form: "original SIMATIC component: xxx-yyyyy-zzzzz", where xxx, yyyyy and zzzzz identifies the respective device and thus corresponds, e.g. to an order number or an article designation in first approximation. A third-party manufacturer who upgrades his device technically to send an identifier in the form "original SIMATIC component . . . " cannot truthfully meet the associated "assertion" because his device is not really an original SIMATIC component but a corresponding derivative of a third-party manufacturer.

Although devices by third-party manufacturers which are provided for operation in the SIMATIC automatic system after corresponding certification measures cannot transmit the identifier "original SIMATIC component . . . " since they are still devices by third-party manufac-turers which are thus not "original components", a string in the form of "module licensed according to certification nnnnnnnnn" can be sent as identifier K, where nnnnnnnnn is a file number of the certification measure or a reference to a message by which the manufacturer of the automation system confirms the certification of this device in the overall automation system to the third-party manufacturer.

The invention has been described in detail with particular reference to preferred embodiments thereof and examples, but it will be understood that variations and modifications can be effected within the spirit and scope of the invention.

The invention claimed is:

1. An automation system from a manufacturer, comprising:
a central processing unit as a head module of the automation system; and
at least one module of the automation system, connectable to said central processing unit, to transmit a device identifier, identifying a special specification of the at least one module and including a legally protected term associated with the manufacturer and containing at least one alphabetic letter, to said central processing unit, said central processing unit evaluating the device identifier by comparison with at least one reference identifier stored in said central processing unit and if the device identifier does not match the reference identifier, said central processing unit refuses said module to be operated on the automation system.

2. The automation system as claimed in claim 1, wherein the legally protected term includes at least one natural language word.

3. The automation system as claimed in claim 1, wherein the legally protected term includes at least one trademark.

4. A module of an automation system from a manufacturer, having a central processing unit as a head module of the automation system, comprising:
an identification transmission unit to transmit a device identifier, identifying a special specification of the module and including a legally protected term associated with the manufacturer and containing at least one alphabetic letter, to the central processing unit of the automation system, the device identifier being provided for evaluation by the central processing unit, where if the device identifier does not match at least one reference identifier stored in the central processing unit, the central processing unit refuses said module to be operated on the automation system.

5. The module as claimed in claim 4, wherein the legally protected term includes at least one natural language word.

6. The module as claimed in claim 4, wherein the legally protected term includes at least one trademark.

7. A head module in an automation system from a manufacturer and connectable to at least one module of the automation system, comprising:
a central processing unit to evaluate a device identifier, transmitted by a module of the automation system, identifying a special specification of the module and including a legally protected term associated with the manufacturer and containing at least one alphabetic letter, by comparing the device identifier with at least one reference identifier stored in said central processing unit and to refuse the module to be operated on by the automation system if the device identifier does not match the at least one reference identifier.

8. The module as claimed in claim 7, wherein the legally protected term includes at least one natural language word.

9. The module as claimed in claim 7, wherein the legally protected term includes at least one trademark.

10. A method of determining operation of a candidate module in an automation system from a manufacturer, comprising:

transmitting a device identifier, identifying a special specification of the candidate module including at least one legally protected term associated with the manufacturer and containing at least one alphabetic letter, from the candidate module to a head module of the automation system;

evaluating the device identifier in the head module by comparison with at least one reference identifier; and denying operation of the candidate module within the automation system if no match is found by said evaluating.

11. The method as claimed in claim 10, wherein the at least one reference identifier is stored in said head module.

12. The method as claimed in claim 10, wherein the legally protected term includes at least one natural language word.

13. The method as claimed in claim 10, wherein the legally protected term includes at least one trademark.

* * * * *

UNITED STATES PATENT AND TRADEMARK OFFICE
CERTIFICATE OF CORRECTION

PATENT NO. : 8,375,438 B1  
APPLICATION NO. : 10/275719  
DATED : February 12, 2013  
INVENTOR(S) : Carsten ten Brink Page 1 of 1

It is certified that error appears in the above-identified patent and that said Letters Patent is hereby corrected as shown below:

Title page item [65] Prior Publication Data, insert -- US Ser. No. 09/425,029 Oct. 25, 1999 --, therefor.

In the Claims  
Column 6, Line 58, In Claim 7, after "on" delete "by".

Signed and Sealed this  
Fourteenth Day of May, 2013

Teresa Stanek Rea  
*Acting Director of the United States Patent and Trademark Office*